UNITED STATES PATENT OFFICE.

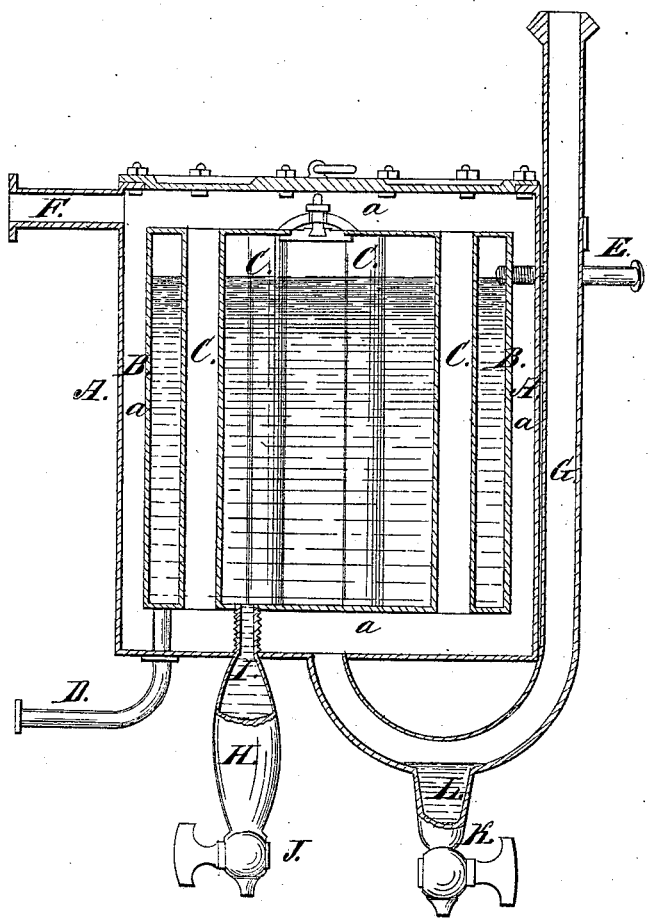

WILLIAM C. DRUM, OF BELLE VERNON, PENNSYLVANIA.

FEED-WATER HEATER FOR STEAM-BOILERS.

Specification of Letters Patent No. 28,840, dated June 26, 1860.

*To all whom it may concern:*

Be it known that I, WILLIAM C. DRUM, of Belle Vernon, in the county of Fayette and State of Pennsylvania, have invented a new and Improved Feed-Water Heater for Steam-Boilers; and I do hereby declare that the following is a full, clear, and exact description of the same, reference being had to the accompanying drawing, forming part of this specification, said drawing representing a central vertical section of the heater.

My improved feed water heater consists of a vessel of cylindrical or other suitable form having inclosed within it a smaller vessel so arranged within it as to leave a space between them above below and on all sides, such smaller vessel, having tubes running through it and communicating at each end with the interior of the larger but not with the interior of the smaller vessel, constituting a water space having an inlet from the feed pipe and an outlet to the boiler and a receptacle below it for sediment, and the space surrounding the smaller vessel and the tubes constituting a steam space having an inlet from the exhaust pipe of the steam engine or other apparatus supplied by the boiler and an escape pipe to the atmosphere with a receiver below said pipe for the collection of the water of condensation, the object of such apparatus being to heat the feed water by the escaping waste steam.

To enable others skilled in the art to make and use my invention I will proceed to describe its construction and operation.

A, is the outer vessel, and B, the inner one having the space *a*, *a*, between them above, below and on all sides.

C, C, are the tubes extending through the inner vessel B, and communicating with the space *a*, *a*, above and below.

D, is the feed pipe entering the inner vessel B, at the bottom, and E, is the pipe leading to the boiler, connected with the opposite side of the said vessel near the top, said pipes communicating with the said vessel through the vessel A, but having no communication with the interior of the latter vessel.

F, is the exhaust steam pipe connecting with the vessel A, near the top, and G, is the escape pipe connecting with the said vessel at the bottom and turned upward in the form of an inverted siphon.

H, is the sediment collector consisting of a vessel of any convenient form arranged below the outer vessel A, and connected with the inner vessel by a pipe I, which communicates with the said vessel through the outer one but has no communication with the latter.

J, is a cock in the bottom of the sediment collector for drawing off the sediment. L, is a receiver below the bottom of the bend of the escape pipe G, for the collection of the water of condensation, and K, is a cock in the bottom of said receiver for drawing off said water.

The operation of the heater is as follows: The steam admitted to the vessel A, by the pipe F, circulates freely in the space *a*, around the vessel B, and through the tubes C, C, and the water forced into the vessel B, circulates between and around the tubes C, C, on its way to the pipe E, which admits it to the boiler. The water absorbs a large proportion of the heat from the steam in the surrounding space *a*, *a*, and the tubes C, C, and becomes heated to a very considerable degree while much of the steam is condensed in the space *a*, *a*, and pipes, and is collected in the receiver K, while the small quantity of steam remaining uncondensed escapes to the atmosphere by the pipe G. As the water is heated in the vessel B, the sedimentary matter which is precipitated or subsides, sinks into the collector H, in which there is no circulation and where it remains till drawn off by the cock J. The water of condensation collected in the receiver L, may be let out by the cock K, to the reservoir from whence the feed is taken.

What I claim as my invention and desire to secure by Letters Patent is—

The heater composed of the vessels A, and B, the tubes C, C, with inlet and outlet pipes D, E, F, G, sediment collector H, and receiver L, the whole combined and arranged substantially as herein described.

WILLIAM C. DRUM.

Witnesses:
THOMAS DUNAWAY,
J. S. VAN VOORHIS.